UNITED STATES PATENT OFFICE 2,668,177

ESTERS OF ARALKYLATED CYCLOHEXANOLS

Gerald M. Corbett, Glenn C. Wiggins, and William S. Thurber, Midland, Mich., assignors to The Dow Chemical Company, Midland, Mich., a corporation of Delaware No Drawing. Application September 23, 1950, Serial No. 186,492

5 Claims. (Cl. 260—488)

This invention concerns certain new esters and a method of making the same. It is particularly concerned with esters formed by reactions between aralkylated cyclohexanols and saturated aliphatic monocarboxylic acids.

The aralkylated cyclohexanols which are employed in preparing the esters of the invention are, themselves, new compounds and are claimed as such in a copending application of Wiggins and Thurber, Serial No. 186,491, filed September 23, 1950. They have a general formula

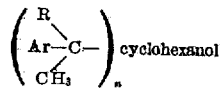

and are prepared by selectively hydrogenating the phenol nucleus of corresponding aralkylated phenols, e. g. alpha-methylbenzyl-phenol, di-(alpha-methylbenzyl-) phenol, tri-(alpha-methylbenzyl-) phenol, or alpha,alpha-dimethylbenzyl-phenol, etc. Such selective hydrogenation may be accomplished by subjecting a mixture of the aralkylated phenol and from 1 to 5 per cent of a hydrogenation catalyst, e. g. finely divided nickel, platinum, or platinum oxide, etc., to contact with hydrogen at a pressure of from 200 to 500 pounds per square inch, gauge, or above, while agitating and heating the mixture at temperatures between 150° and 250° C., and discontinuing the reaction when from 2.4 to 3 molecular equivalents of hydrogen have been consumed per mole of the aralkylated phenol starting material. The reaction may be terminated by cooling the vessel in which it is carried out, venting the unconsumed hydrogen, and filtering or decanting the mixture to remove the catalyst. In many instances, the aralkylated cyclohexanol is obtained directly in substantially pure form. When necessary, it may be purified in usual ways, e. g. by distillation. Examples of aralkylated cyclohexanols which may be prepared as just described, and which are suitable for use as starting materials in making the esters of the present invention, are alpha-methylbenzyl-cyclohexanol, di(alpha-methylbenzyl) cyclohexanol, tri-(alpha-methylbenzyl)-cyclohexanol, alpha,alpha-dimethylbenzyl-cyclohexanol, 2-methyl-6-(alpha-methylbenzyl) cyclohexanol, 2-methyl-4-(alpha-methylbenzyl) cyclohexanol, 4-methyl-2-(alpha,alpha-dimethylbenzyl) cyclohexanol and 2-methyl-4-(alpha,alpha-dimethylbenzyl) cyclohexanol, etc.

The aralkylated cyclohexanol esters which are provided by the invention are high boiling liquid to crystalline compounds having a generic formula:

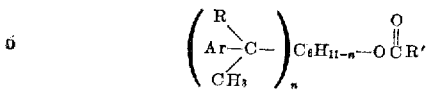

wherein "Ar" represents a monovalent aromatic radical of the benzene series having its valence on a carbon atom of the benzene nucleus, R represents hydrogen or a methyl radical, R' is an alkyl radical, and "$C_6H_{11-n}$" is a polyvalent cyclohexane nucleus. The esters are compatible with cellulose esters and ethers, e. g. cellulose acetate and ethyl cellulose; and with various vinyl- and vinylidene-ester polymers such as polymerized vinyl acetate, polymers of vinyl chloride, and copolymers of vinyl chloride and vinylidene chloride, etc.; and are useful as plasticizers for such cellulose derivatives and polymeric materials. A number of the aralkylated cyclohexanol esters are fragrant and may be used as odoriferous ingredients of perfumes, but certain of the higher boiling esters are substantially non-volatile at room temperature and atmospheric pressure and have little, or no, odor. The odorless esters are useful as fixative ingredients of perfumes.

The esters are prepared by reacting the aralkylated cyclohexanols with saturated aliphatic monocarboxylic acids in the presence of catalysts. The reactants are usually employed in approximately equimolecular proportions, but either reactant may be present in as large an excess as desired. Any active esterification catalyst, e. g. sulphuric acid, or hydrochloric acid, etc., may be employed in the reaction, but organic sulphonic acids, and particularly aryl sulphonic acids such as benzene sulphonic acid, toluene sulphonic acid, or naphthalene sulphonic acid, etc., are highly effective and are preferred. The catalyst is usually employed in amount corresponding to from 0.5 to 2 per cent of the combined weight of the reactants, but it may be used in smaller or larger proportions. The esterification may be accomplished by heating the mixture to a reaction temperature, e. g. 70° C. or above, at atmospheric, sub-atmospheric, or super-atmospheric pressure and in the presence or absence of an inert liquid reaction medium. Usually, a volatile, water-immiscible inert diluent such as benzene, toluene, xylene, ethylene chloride, propylene chloride, or petroleum naphtha, etc., is added to distill with, and facilitate distillation of, water from the mixture as it is formed, but such use of a diluent, or water-entraining agent, is not required.

In practice, a mixture of the reactants and catalyst in the above-stated proportions, together with 25 per cent by volume, or more, of an inert, water-immiscible, volatile organic liquid, e. g. toluene, or other of the aforementioned diluents, is heated to boiling at atmospheric pressure or thereabout and a mixture of the diluent and water, formed by the esterification, is distilled off as the reaction is taking place. Heating is usually continued until the formation and distillation of water ceases. The mixture may then be washed with water or neutralized with an alkali to remove or destroy the catalyst, after which the diluent and other relatively volatile components may be distilled to obtain the ester as a residue. In most instances, the distillation may, if desired, be continued under vacuum to distill, and thus further purify, the ester product.

The following examples describe a number of ways in which the invention has been practiced, but are not to be construed as limiting its scope.

Example 1

A mixture of 81.5 grams of 2-alpha-methylbenzyl-cyclohexanol, 81.5 grams of 4-alpha-methylbenzyl-cyclohexanol, 60 grams of glacial acetic acid, 2 grams of para-toluene sulphonic acid and 200 cubic centimeters of benzene was boiled under reflux for 8 hours, a portion of the benzene, and water formed in the reaction being distilled from the mixture during this period. The mixture was then washed with water, neutralized with an aqueous sodium carbonate solution, again washed with water, and distilled to recover the ester products. The distillation was carried out at atmospheric pressure until most of the benzene had been removed, after which it was continued under vacuum. As the fraction distilling at 140° C. at 2.5 millimeters absolute pressure, there was obtained a colorless liquid mixture of 2-alpha-methylbenzyl-cyclohexyl acetate and 4-alpha-methylbenzyl-cyclohexyl acetate. This product had a specific gravity of 0.990 at 25° C. and an index of refraction, $n_d^{25}$, of 1.4940. It has a mild fragrance.

Example 2

A mixture of 180 grams of 2,4-di-(alpha-methylbenzyl) cyclohexanol, 40 grams of acetic acid, 2 grams of para-toluene sulphonic acid and 200 cubic centimeters of benzene was heated to boiling under reflux for 10 hours, water formed in the reaction being distilled together with a portion of the benzene during this period of heating. The mixture was then washed with water, neutralized with an aqueous sodium carbonate solution, again washed with water, and distilled to separate the ester product. As the fraction distilling at 150°–160° C. at 2 millimeters absolute pressure, 2,4-di-(alpha-methylbenzyl) cyclohexyl acetate was obtained. This product is a colorless liquid having a specific gravity of 1.022 at 25° C. and an index of refraction, $n_d^{25}$, of 1.5203. It possesses a pleasant, mild fragrance.

Example 3

A mixture of 195 grams of 2,4,6-tri-(alpha-methylbenzyl) cyclohexanol, 31 grams of acetic acid, 2 grams of para-toluene sulphonic acid and 200 cubic centimeters of benzene was reacted by boiling the same under reflux while distilling off a mixture of water and part of the benzene, and was thereafter neutralized, water-washed, and the ester product separated by distillation, as in each of the preceding examples. The compound, 2,4,6-tri-(alpha-methylbenzyl) cyclohexyl acetate was obtained as a slightly yellow, viscous liquid distilling at approximately 220° C. at 2 millimeters absolute pressure. It is nearly odorless.

Example 4

A mixture of 216 grams of 4-(alpha,alpha-dimethylbenzyl) cyclohexanol, 120 grams of glacial acetic acid, 10 grams of beta-naphthalene sulphonic acid and 500 cubic centimeters of benzene was boiled under reflux while distilling benzene and water, formed by the esterification reaction, from the mixture. The aqueous and benzene layers of the distillate were separated and the benzene returned in continuous manner to the reaction vessel. Operation in this manner was continued until the rate at which water was being formed and distilled from the mixture had decreased markedly. The mixture was then washed thoroughly with water and fractionally distilled to separate the ester product. The compound, 4-(alpha,alpha-dimethylbenzyl) cyclohexyl acetate, was obtained as a colorless liquid distilling at 172°–174° C. at 8 millimeters absolute pressure. It has a specific gravity of 1.013 at 26° C. and an index of refraction, $n_d^{25}$, of 1.5012. The product possesses a mild fragrance.

Example 5

A mixture of approximately 204 grams of 2-(alpha-methylbenzyl) cyclohexanol, 204 grams of 4-(alpha-methylbenzyl) cyclohexanol, 148 grams of propionic acid, 15 grams of para-toluene sulphonic acid, and 500 cubic centimeters of cyclohexane was boiled under reflux (i. e. at about 90° C.) while distilling off a mixture of cyclohexane and water, separating the cyclohexane layer of the distillate and returning said layer continuously to the esterification reaction. Operation in this manner was continued for about 4 hours, i. e. until the cyclohexane being distilled was nearly free of water. Approximately 36 grams, i. e. the theoretical amount, of water was collected in the distillate. The mixture was then cooled, washed with water, neutralized with an aqueous sodium carbonate solution, again washed with water and fractionally distilled to separate the ester product. As the fraction distilling at 124°–130° C. at 1 millimeter absolute pressure, there was obtained 387.4 grams, i. e. 74.5 per cent of the theoretical yield, of a mixture of 2-(alpha-methylbenzyl) cyclohexyl propionate and 4-(alpha - methylbenzyl) cyclohexyl propionate. This fraction of product is a colorless liquid having a specific gravity of 0.999 at 25° C. and an index of refraction of 1.4992 at 25° C.

Example 6

A mixture of approximately 204 grams of 2-(alpha-methylbenzyl) cyclohexanol, 4-(alpha-methylbenzyl) cyclohexanol, 176 grams of butyric acid, 15 grams of para-toluene sulphonic acid, and 500 cubic centimeters of cyclohexane was boiled under reflux for 10 hours, water and cyclohexane being distilled from the mixture and the cyclohexane separated from the water and returned continuously to the reaction zone during the period of heating. The mixture was then washed, neutralized and the ester product separated by distillation, as in Example 5. As the product, there was obtained 370 grams, or 67.5 per cent of the theoretical yield of a colorless liquid mixture of 2-(alpha-methylbenzyl) cyclohexyl butyrate and 4 - (alpha - methylbenzyl) cyclohexyl butyrate. The product has a specific gravity of 0.989 at 25° C. and an index of refraction, $n_d^{25}$, of 1.4965.

Example 7

A mixture of approximately 204 grams of 2-(alpha-methylbenzyl) cyclohexanol, 204 grams of 4-(alpha-methylbenzyl) cyclohexanol, 232 grams of caproic acid, 20 grams of para-toluene sulphonic acid and 500 cubic centimeters of cyclohexane was heated to boiling under reflux for 6 hours, water and cyclohexane being distilled and the cyclohexane separated and returned continuously to the reaction during this period. Thereafter, the mixture was neutralized, washed with water, and distilled to separate the ester product, as in Example 5. As the product, distilling at 165°-168° C. at 2 millimeters absolute pressure, there was obtained 347 grams, or 57.5 per cent of the theoretical yield, of a light-yellow liquid mixture of 2-(alpha-methylbenzyl) cyclohexyl caproate and 4-(alpha-methylbenzyl) cyclohexyl caproate. The product has a specific gravity of 0.976 at 25° C. and an index of refraction, $n_d^{25}$, of 1.4968.

Example 8

A mixture of approximately 204 grams of 2-(alpha-methylbenzyl) cyclohexanol, 204 grams of 4-(alpha-methylbenzyl) cyclohexanol, 400 grams of lauric acid, 15 grams of para-toluene sulphonic acid, and 500 cubic centimeters of cyclohexane was boiled under reflux, with distillation of water and cyclohexane from the mixture, for 8 hours, the cyclohexane being continuously separated from the aqueous phase of the distillate and returned to the reaction zone during this period. The mixture was then neutralized, washed with water, and fractionally distilled, as in Example 5. As the product, distilling at from 170° to 175° C. at 1 millimeter absolute pressure, there was obtained 189 grams, or 49 per cent of the theoretical yield, of a liquid mixture of 2-(alpha-methylbenzyl) cyclohexyl laurate and 4-(alpha-methylbenzyl) cyclohexyl laurate. The product is light-yellow, has a specific gravity of 0.941 at 25° C. and an index of refraction, $n_d^{25}$, of 1.4898.

Example 9

A mixture of approximately 164.5 grams of 2-(alpha-methylbenzyl) cyclohexanol, 164.5 grams of 4-(alpha-methylbenzyl) cyclohexanol, 461 grams of stearic acid, 15 grams of para-toluene sulphonic acid and 500 cubic centimeters of cyclohexane was reacted at the boiling temperature for 8 hours and the product thereafter separated by distillation, as in Example 7. As the product, there was obtained 256 grams of a fraction distilling at 180°-187° C. at 1.5 millimeters absolute pressure and consisting of a mixture of 2-(alpha-methylbenzyl) cyclohexyl stearate and 4-(alpha-methylbenzyl) cyclohexyl stearate. The product crystallized as a white waxy solid. The yield was 33.8 per cent of theoretical.

Example 10

A number of the aralkyl-cyclohexyl esters of the foregoing examples were tested to determine their effectiveness as plasticizers for a solid copolymer of approximately 90 per cent by weight vinylidene chloride and 10 per cent vinyl chloride to increase the rate of flow of the copolymer during molding under pressure. The procedure in carrying out the tests was to admix 9 parts by weight of the finely divided copolymer with 1 part of the ester, the latter being in most instances thinned with about one-tenth its volume of acetone so as to facilitate absorption of the ester by the particles of the copolymer. Acetone was then vaporized from the treated copolymer by heating the latter in an oven at 70° C. for 1 hour. A three gram portion of the plasticized copolymer was pressed to form a billet of 1¼ inches diameter and the latter was heated to 180° C. and pressed between platens, at a pressure of 117 pounds per square inch of surface of one of the platens, until it was molded into a disk having an area corresponding to that of one of the platens. During molding in this manner, the varying rate of movement of one platen toward the other was determined and constitutes a measure of the rate of flow of the copolymer at the above-stated temperature and pressure. From the data thus collected, the viscosity in poises at 180° C. of the plasticized copolymer was calculated. As a basis of comparison, a billet of the unplasticized copolymer was similarly molded and its viscosity determined. The following table names the esters employed as plasticizers in the several experiments and gives the viscosity values which were determined.

Table

| Test No. | Plasticizer | Viscosity, poises at 180° C. |
|---|---|---|
| 1 | None | 41,000 |
| 2 | 2- and 4-(alpha-methylbenzyl) cyclohexyl propionate. | 4,200 |
| 3 | 2- and 4-(alpha-methylbenzyl) cyclohexyl butyrate. | 4,700 |
| 4 | 2- and 4-(alpha-methylbenzyl) cyclohexyl caproate. | 4,500 |
| 5 | 2- and 4-(alpha-methylbenzyl) cyclohexyl laurate. | 3,900 |
| 6 | 2- and 4-(alpha-methylbenzyl) cyclohexyl stearate. | 2,700 |

Other modes of applying the principle of the invention may be applied instead of those explained, change being made as regards the method or products herein disclosed, provided the steps or compounds stated by any of the following claims or the equivalent of such stated steps or compounds be employed.

We therefore particularly point out and distinctly claim as our invention:

1. An aralkyl-cyclohexyl ester having the general formula:

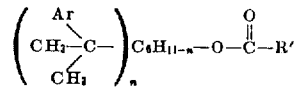

wherein Ar is a monovalent monocyclic hydrocarbon radical of the benzene series, R' is an alkyl radical containing not more than 17 carbon atoms and $n$ is an integer of from 1 to 3 in each

group is substituted in one of the 2-, 4-, and 6-positions of the cyclohexyl radical.

2. An aralkyl-cyclohexyl ester having the general formula:

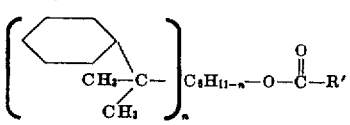

wherein R' is an alkyl radical containing not more than 17 carbon atoms and $n$ is an integer of from 1 to 3, and wherein each

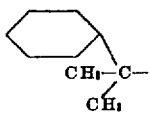

group is substituted in one of the 2-, 4-, and 6-positions of the cyclohexyl radical.

3. An aralkyl-cyclohexyl ester having the general formula:

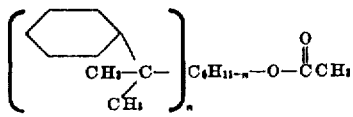

wherein $n$ is an integer of from 1 to 3, and wherein each

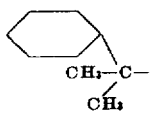

group is substituted in one of the 2-, 4-, and 6-positions of the cyclohexyl radical.

4. 4-(alpha,alpha-dimethylbenzyl) cyclohexyl acetate.

5. A method of making an aralkyl-cyclohexyl ester which comprises heating to a reaction temperature a mixture of a saturated aliphatic monocarboxylic acid, an aralkyl-cyclohexanol having the general formula:

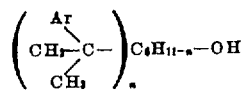

wherein Ar is a monovalent monocyclic hydrocarbon radical of the benzene series having its valence on a carbon atom of the benzene nucleus, and $n$ is an integer of from 1 to 3 and wherein each,

group is substituted in one of the 2-, 4-, and 6-positions of the cyclohexyl radical, together with an esterification catalyst and an inert, volatile, water-immiscible organic solvent, while distilling off a mixture of the solvent and water formed by the esterification reaction, and thereafter separating the aralkyl-cyclohexyl ester product by distillation.

GERALD M. CORBETT.
GLENN C. WIGGINS.
WILLIAM S. THURBER.

References Cited in the file of this patent

Fieser et al., "Organic Chemistry" (D. C. Heath and Co., Boston, 1944), p. 32.

Chemical Abstracts, vol. 31, p. 7408 (1937).